(No Model.)
W. H. WOOD & G. RICHMOND.
APPARATUS FOR SEPARATING LIQUIDS FROM GASES AND STEAM.
No. 294,300. Patented Feb. 26, 1884.
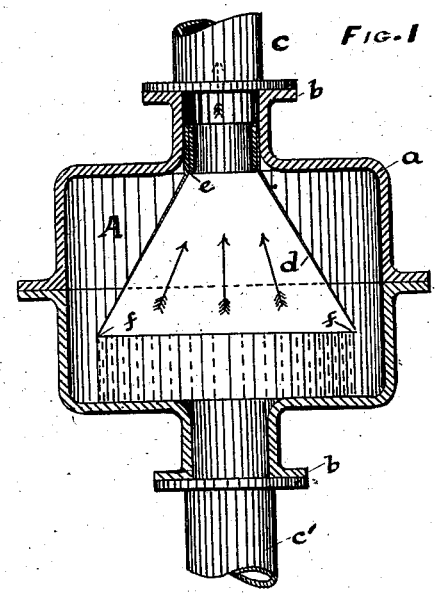
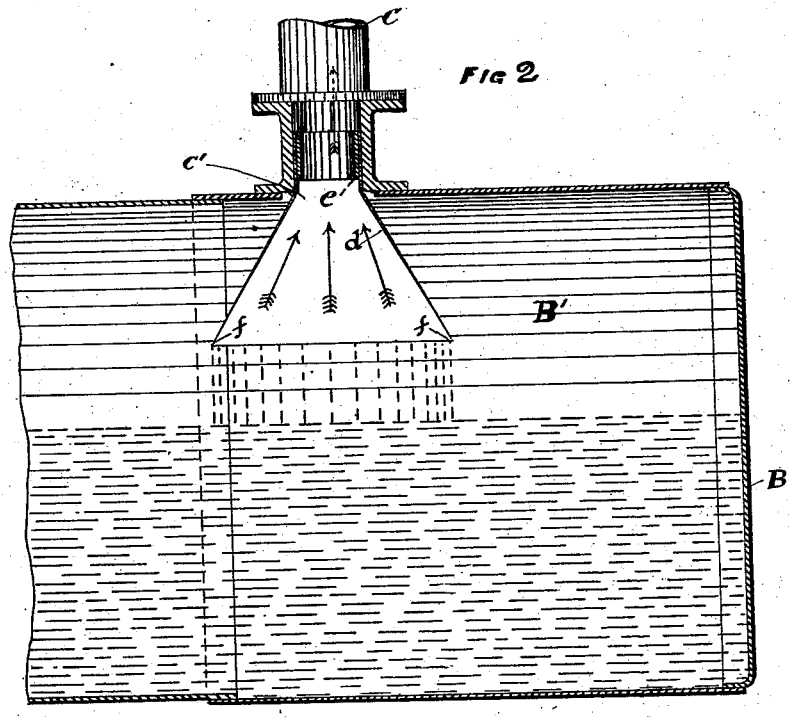
WITNESSES:
Louis Cohan
Isaac Angel
INVENTORS
William H. Wood,
Geo Richmond
BY Louis Bagger & Co
ATTORNEYS

UNITED STATES PATENT OFFICE.

WILLIAM H. WOOD AND GEORGE RICHMOND, OF NEW YORK, N. Y.

APPARATUS FOR SEPARATING LIQUIDS FROM GASES AND STEAM.

SPECIFICATION forming part of Letters Patent No. 294,300, dated February 26, 1884.

Application filed February 20, 1883. Renewed January 26, 1884. (No model.)

*To all whom it may concern:*

Be it known that we, WILLIAM H. WOOD and GEORGE RICHMOND, of New York, in the county of New York and State of New York, have invented certain new and useful Improvements in Apparatus for Separating Liquids from Gases and Steam; and we do hereby declare that the following is a full, clear, and exact description of the invention, which will enable others skilled in the art to which it appertains to make and use the same, reference being had to the accompanying drawings, which form a part of this specification, and in which—

Figure 1 is a sectional view of our apparatus as adapted for use on refrigerating-machines and for other purposes, and Fig. 2 is a sectional view of the apparatus as applied to a steam-boiler.

Similar letters of reference indicate corresponding parts in both the figures.

Our invention has relation to means for preventing liquids from escaping with or being carried over by the gas or vapor generated from or contained in and mechanically mixed with the liquid. When a gas or vapor is drawn off from a liquid, it generally happens, as is well known, that a portion of the liquid is carried over with the gas or vapor, as in the "priming" of the cylinders of steam-engines by water carried from the boiler into the cylinder with the steam. In the gas-pumps of refrigerating-machines, where the gas or vapor is pumped through a liquid seal, the same difficulty occurs, part of the liquid being carried forward by the gas or vapor. The cause of this inconvenience is found in the fact that the thin film of liquid which adheres to the sides of the steam-dome of the boiler or inner walls of the pump-cylinder, as the case may be, (owing to capillary attraction,) is dislodged and swept forward by the pressure of the steam or vapor as it escapes in a strong, sweeping current through the outlet, and by breaking this current and diverting it in such a manner that it will have to pass across a thin knife-edge before the outlet can be reached the steam— or vapor—current may be divested completely of the atoms of water or other liquids with which it is charged. It is to this class of devices to which our apparatus relates; and the novelty consists in the detailed construction and arrangement of the same, as hereinafter more fully described and claimed.

Reference being had to Fig. 1 of the drawings, the letters *a a* denote two shells, which are bolted together, so as to form a chamber or receiver, A, preferably cylindrical in shape. Both the parts *a* are made with flanged necks *b b*, to which the inlet and outlet pipes shown at *c'* and *c* are respectively bolted. *d* is a hollow cone or inverted funnel, which is fixed in the upper neck, *b*, by a ferrule, *e*, or by other suitable means. The lower enlarged end of this funnel is finished off to a knife-edge, *f*, while its top is of cylindrical shape to fit into the flanged neck or outlet *b*.

In Fig. 2 the arrangement of parts is substantially the same, with the difference only that we dispense with the chamber A, the funnel *d* being inserted into the outlet of the steam-chamber B' of the boiler B and held in place by the collar or ferrule *e*.

The operation of the apparatus is as follows: The film of liquid adhering to the walls of the steam-chamber B', or (as in the case of the gas-pump of a refrigerating-machine) to the walls of the pump-cylinder, is swept, with the current of steam or vapor, along the sides of the steam-chamber B' or receiver A, as the case may be, but cannot enter the outlet on account of the funnel *d*. Any liquid which, in the form of a film, forms upon or is swept upon the outside of the funnel itself will, by its gravity, descend the same and drip off from the knife-edge *f*, while the steam or gas, deprived of the liquid with which it was mixed, will escape in its pure state through the outlet-pipe *c*, as indicated by the arrows.

Having thus described our invention, we claim and desire to secure by Letters Patent of the United States—

1. The combination of the receiver A, having flanged necks *b b*, inlet-pipe *c'*, inverted funnel *d*, having knife-edge *f*, means for securing the funnel in the upper flanged neck of the receiver, and outlet-pipe *c*, substantially as and for the purpose shown and specified.

2. The combination of the receiver A, having flanged necks $b$ $b$, inlet-pipe $c'$, inverted funnel $d$, having knife-edge $f$, ferrule $e$, and outlet-pipe $c$, substantially as and for the purpose shown and specified.

3. The combination, with the outlet-pipe $c$ of a steam-boiler or gas-generator, of the inverted funnel $d$, having knife-edge $f$, and fitting with its upper contracted end into the outlet, substantially as and for the purpose herein shown and set forth.

In testimony that we claim the foregoing as our own we have hereunto affixed our signatures in presence of two witnesses.

WILLIAM H. WOOD.
    GEORGE RICHMOND.

Witnesses:
 WM. S. DOLBEY,
 HENRY E. KLUGH.